United States Patent
Wang et al.

(10) Patent No.: US 12,123,134 B2
(45) Date of Patent: Oct. 22, 2024

(54) APPLICATION OF DEEP EUTECTIC SOLVENT IN TEXTILE DYEING

(71) Applicant: Jiangnan University, Wuxi (CN)

(72) Inventors: Qiang Wang, Wuxi (CN); Yimin Wei, Wuxi (CN); Ping Wang, Wuxi (CN); Yuanyuan Yu, Wuxi (CN); Man Zhou, Wuxi (CN); Zhe Jiang, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 18/106,685

(22) Filed: Feb. 7, 2023

(65) Prior Publication Data

US 2023/0175201 A1 Jun. 8, 2023

Related U.S. Application Data

(63) Continuation of application No. PCT/CN2022/072693, filed on Jan. 19, 2022.

(30) Foreign Application Priority Data

Feb. 20, 2021 (CN) .......................... 202110193071.8

(51) Int. Cl.
*D06P 1/90* (2006.01)
*C09B 49/04* (2006.01)
*C09B 67/10* (2006.01)
*C09B 67/40* (2006.01)
*D06P 1/92* (2006.01)
*D06P 3/02* (2006.01)

(52) U.S. Cl.
CPC .............. *D06P 3/023* (2013.01); *C09B 49/04* (2013.01); *C09B 67/0014* (2013.01); *C09B 67/0082* (2013.01); *D06P 1/928* (2013.01)

(58) Field of Classification Search
CPC ...... D06P 3/023; D06P 1/928; D06P 1/65118; D06P 1/65125; D06P 1/653; D06P 1/6533; D06P 1/66; D06P 3/16; D06P 3/66; D06P 1/38; C09B 49/04; C09B 67/0014; C09B 67/0082; C09B 67/0083; Y02P 20/54
USPC ............................................................ 8/449
See application file for complete search history.

(56) References Cited

FOREIGN PATENT DOCUMENTS

| CN | 108797153 A | * | 11/2018 | .......... D06M 15/263 |
| CN | 110668525 A | * | 1/2020 | ................ C02F 1/26 |
| CN | 111235908 A |   | 6/2020 | |
| CN | 112813708 A |   | 5/2021 | |

OTHER PUBLICATIONS

Wang, Xin, "Dissolution and dying behavior of disperse red 73 in deep eutectic solvent", Thesis Dissertation, Donghua University, Jan. 14, 2019.

* cited by examiner

*Primary Examiner* — Eisa B Elhilo
(74) *Attorney, Agent, or Firm* — IPRO, PLLC

(57) ABSTRACT

The present disclosure discloses application of a deep eutectic solvent in textile dyeing, belonging to the technical field of ecological dyeing and finishing of textiles. A natural hydrophobic deep eutectic solvent system (HDES) is first used as a dyeing medium to perform reactive dyeing on cotton. Firstly, the prepared natural hydrophobic deep eutectic solvent is mixed with a small amount of dye aqueous solution at high speed to prepare dye liquor, and then cotton fabric soaked with alkali liquor is put into a dye bath for dyeing. The dyeing method doesn't require addition of inorganic salts and other dyeing auxiliaries, but uses a small amount of water and alkali agent to achieve the same dyeing effect as traditional water bath, and the dyeing medium is safe and environment-friendly. After dyeing, cyclic dyeing can be achieved by simply separating the dye bath, which truly realizes green dyeing of reactive dyes.

18 Claims, No Drawings

APPLICATION OF DEEP EUTECTIC SOLVENT IN TEXTILE DYEING

TECHNICAL FIELD

The present disclosure relates to application of a deep eutectic solvent in textile dyeing, belonging to the technical field of ecological dyeing and finishing of textiles.

BACKGROUND

Cotton fabric is favored by everyone because of its comfortable wearing, soft material, good air permeability, excellent dyeing performance and other characteristics. It has become natural fibers with largest market demand for textile purposes. At present, the cotton fabric is mainly dyed with reactive dyes, which is an important production link in the textile printing and dyeing industry. The reactive dyes can be combined with cellulose fibers in a form of covalent bonds, which can make dyed fabrics have better color fastness. Furthermore, the reactive dyes have the advantages of variety, complete chromatography, bright color, simple dyeing process, etc. They have gradually replaced direct dyes, sulfur dyes and vat dyes, and become the main dyes for dyeing the cellulose fibers. However, the reactive dyes have many disadvantages when being used for dyeing in the traditional water bath: (1) the molecular structures of the reactive dyes contain water-soluble groups that can be ionized into dye anions in water, while the cellulose fibers are generally negatively charged in a dye bath; there is electrostatic repulsion between the fibers and the dyes, resulting in low dye uptake of the dyes; and a large amount of neutral electrolyte needs to be added to promote dyeing, so that dyeing wastewater contains a large amount of electrolyte (such as anhydrous sodium sulphate), and the treatment difficulty of the dyeing wastewater is accordingly increased. (2) A reaction between reactive groups on the reactive dyes and fibers needs to be carried out under alkaline conditions, and the reactive dyes are easy to be hydrolyzed in the dye bath and thus will fall off during subsequent water washing and soaping processes, so that the dyeing wastewater contains a large amount of hydrolyzed dyes. With the increasing shortage of water resources and the enhancement of people's awareness of environmental protection, it is a new trend for the development of today's printing and dyeing industry to solve the problems of reactive dye dyeing, reduce the discharge of wastewater caused by printing and dyeing, and develop new dyeing technologies requiring less water and no salt. At present, the research on water-reduced/water-free dyeing mainly includes supercritical carbon dioxide dyeing, organic solvent dyeing, liquid ammonia dyeing and vacuum sublimation dyeing.

The supercritical carbon dioxide dyeing technology has been studied for more than 30 years, and has been a hot spot in non-aqueous medium dyeing research. Although the supercritical carbon dioxide dyeing has many advantages, it has been unable to achieve industrial scale application due to its few applicable dyes and fibers as well as high requirements for equipment and operators. An organic solvent is used to replace water as a dyeing medium, which can avoid dye hydrolysis to a certain extent and achieve high dye uptake and fixation rate. However, new environmental, ecological and safety problems will be caused in the dyeing process of the organic solvent, and the cost of solvent recovery is high, which also leads to the failure in achieving industrial production. The liquid ammonia dyeing has the problems such as low fixation rate, poor color fastness and high requirements for equipment; and the vacuum sublimation dyeing technology has not been further developed due to its high requirements for equipment and serious pollution. Therefore, the key to solve the problems of reactive dyeing is to find a green, safe and economical water-free/water-reduced dyeing technology capable of realizing cyclic dyeing.

SUMMARY

A deep eutectic solvent (DES) is usually composed of two or more compounds, i.e., a combination of a hydrogen bond donor (HBD) and a hydrogen bond acceptor (HBA), which can be connected to each other by hydrogen bonds. Most DES studied before 2015 are hydrophilic, and their practical application is greatly limited due to their miscibility with water. The hydrophobic deep eutectic solvent appears under such a background. The present disclosure for the first time uses a natural hydrophobic deep eutectic solvent system (HDES) as a dyeing medium to perform reactive dyeing on cotton, and raw materials of the employed natural hydrophobic deep eutectic solvent are derived from natural ingredient terpene, which is biodegradable, non-toxic and green. The solvent is generally composed of the hydrogen bond donor and the hydrogen bond acceptor. A small amount of dye aqueous solution and the HDES form a semi-stable emulsion system. Under the premise of not using inorganic salts and other dyeing auxiliaries, the water-reduced and salt-free dyeing of reactive dyes is realized. Due to the hydrophobicity of the HDES, after dyeing, cyclic dyeing can be achieved by simply separating the dye bath, which greatly reduces sewage discharge.

The present disclosure discloses a dyeing method of cellulose textiles with reactive dyes. The dyeing method includes the steps of mixing a hydrophobic deep eutectic solvent with the reactive dyes to obtain a dye liquor, and then dyeing the cellulose textiles with the dye liquor; the hydrophobic deep eutectic solvent includes a hydrogen bond donor and a hydrogen bond acceptor; and the water content in the dye liquor is 60%-150% o.w.f, where o.w.f refers to a mass percentage relative to a fabric gram weight, and the unit is g/g.

In one implementation of the present disclosure, the dyeing process does not require the use of inorganic salts and other dyeing auxiliaries.

In one implementation of the present disclosure, the hydrogen bond donor includes thymol or tetradecyl alcohol; and the hydrogen bond acceptor includes menthol or coumarin.

In one implementation of the present disclosure, the molar ratio of the hydrogen bond donor to the hydrogen bond acceptor is (0.5-2):1.

In one implementation of the present disclosure, the mass ratio of the hydrophobic deep eutectic solvent to the reactive dyes in the dye liquor is (990-930):1.

In one implementation of the present disclosure, cotton fabric is soaked in a sodium carbonate aqueous solution to make fibers swell, and then the cotton fabric is dyed at a certain liquid entrainment rate, where dyeing is carried out at room temperature first, and then fixation is performed at elevated temperature.

In one implementation of the present disclosure, the method includes the specific steps of:
  (1) firstly, evenly mixing the hydrogen bond donor and the hydrogen bond acceptor to obtain the hydrophobic deep eutectic solvent;

(2) dissolving the reactive dyes in water, and then mixing with the hydrophobic deep eutectic solvent prepared in step (1) to obtain the dye liquor; and (3) swelling cotton fabric in a sodium carbonate aqueous solution, and then putting same into the dye liquor for dyeing.

In one implementation of the present disclosure, in step (1), the hydrogen bond donor is thymol, the hydrogen bond acceptor is menthol, the molar ratio of the menthol to the thymol is 1:1 to 2:1, the temperature is 40-60° C., and the time is 40-60 min.

In one implementation of the present disclosure, the mixing speed of an dye aqueous solution and menthol-thymol in step (2) is 10,000-14,000 rpm.

In one implementation of the present disclosure, in step (2), the bath ratio is 1:20 to 1:40, and the water content in the system is 60% o.w.f-140% o.w.f, preferably 100%-120% o.w.f.

In one implementation of the present disclosure, in step (2), there is no special limit on the amount of the reactive dyes, and the amount of the dyes can be determined according to the requirement for actual dyeing depth. The reactive dyes are vinyl sulfone reactive dyes, sym-triazine dyes and bifunctional reactive dyes; and for example, the vinyl sulfone reactive dyes may be reactive blue 19, the sym-triazine dyes may be reactive yellow 3, and the bifunctional reactive dyes may be reactive red 195.

In one implementation of the present disclosure, in step (3), the concentration of sodium carbonate is 20-100 g/L, the swelling time is 40-70 min, and the liquid entrainment rate of cotton fabric is 60%-140%; and the concentration of the sodium carbonate is preferably 60 g/L, and the liquid entrainment rate of the cotton fabric is preferably 100%.

In one implementation of the present disclosure, in step (3), the dyeing process is as follows: dyeing at room temperature for 30 min, then heating up to 50-70° C., and performing fixation for 10-60 min, where the heating rate is 2° C./min, the fixation temperature is preferably 60° C., and the fixation time is preferably 30 min.

In one implementation of the present disclosure, the cellulose textiles include any one of cellulose fibers or composite fibers containing the cellulose fibers, yarns, blanket fabrics, woven fabrics, knitted fabrics, warm keeping wadding, fillers, non-woven fabrics, clothing, clothing accessories, home textiles, decorations, medical and health supplies or special work clothes.

In one implementation of the present disclosure, the cellulose fibers include natural cellulose fibers and artificial cellulose fibers.

The present disclosure discloses a cellulose textile dyed by the above method.

The present disclosure discloses a dye liquor, and the dye liquor includes a hydrophobic deep eutectic solvent and reactive dyes; and the hydrophobic deep eutectic solvent includes a hydrogen bond donor and a hydrogen bond acceptor.

In one implementation of the present disclosure, the mass ratio of the hydrophobic deep eutectic solvent to the reactive dyes in the dye liquor is (900-990):1.

In one implementation of the present disclosure, the water content in the dye liquor accounts for 1-10% of the mass of the whole dye liquor.

In one implementation of the present disclosure, the dye liquor is emulsion.

In one implementation of the present disclosure, according to a preparation method of the dye liquor, the dye aqueous solution is mixed with the natural hydrophobic deep eutectic solvent at high speed to obtain a semi-stable emulsion system.

Preferably, the mass ratio of the dye aqueous solution to the hydrophobic eutectic solvent is 1:19, and the speed is 12,000 rpm.

In one implementation of the present disclosure, the dye liquor is a the dye liquor capable of realizing cyclic dyeing. The residual dye liquor is allowed to stand to remove a small amount of the remaining dye aqueous solution, and a clear non-aqueous medium is thus obtained, so that cyclic dyeing can be achieved.

The present disclosure discloses a dye liquor, and the dye liquor includes a hydrophilic acidic deep eutectic solvent and an acid dye.

In one implementation of the present disclosure, the mass ratio of the hydrophilic acidic deep eutectic solvent to the acid dye is 500:1 to 20,000:1, where the hydrophilic acidic deep eutectic solvent can dissolve dyes as a solvent.

In one implementation of the present disclosure, the deep eutectic solvent includes a hydrogen bond donor and a hydrogen bond acceptor.

In one implementation of the present disclosure, the hydrogen bond donor in the hydrophilic acidic deep eutectic solvent is a quaternary ammonium salt, including choline or betaine; and the hydrogen bond acceptor is a carboxylic acid, including formic acid, acetic acid, oxalic acid, citric acid or malic acid.

In one implementation of the present disclosure, the molar ratio of the quaternary ammonium salt to the carboxylic acid is 1:(0.5-2), preferably 1:2.

In one implementation of the present disclosure, the water content in the dye liquor is 0-15%. Preferably, the dye liquor does not contain water.

In one implementation of the present disclosure, the acid dye refers to dye molecules containing acid groups, also known as an anionic dye, including but not limited to Pula brilliant B, acid indigo and neutral red S-B.

The present disclosure discloses application of dye liquor in dyeing.

The present disclosure discloses application of a deep eutectic solvent in textile dyeing.

The present disclosure discloses a dyeing method for protein textiles with an acid dye, and the method employs the above dye liquor to dye the protein textiles.

In one implementation of the present disclosure, the dyeing process does not require the use of inorganic salts and other dyeing auxiliaries.

In one implementation of the present disclosure, the protein textiles include protein fibers, or composite fibers, yarns or fabrics which contain protein fibers.

In one implementation of the present disclosure, the protein fibers include natural protein fibers and artificial protein fibers; the natural protein fibers include wool, silk, chicken feather, cow hair, duck feather, rabbit hair, yak hair, mohair, and camel hair; the artificial protein fibers refer to fibers that are made from protein extracted from milk, soybeans, peanuts, corn and other natural materials and prepared by dissolving the protein raw material in an appropriate solvent, including milk protein fibers, casein fibers, soybean protein fibers and regenerated protein fibers.

In one implementation of the present disclosure, the weight ratio of dye to fabric is 0.5%-4%. Preferably, the weight ratio of dye to fabric is 2%.

In one implementation of the present disclosure, the dyeing temperature is 70-100° C., preferably 80° C.

The present disclosure discloses protein textiles obtained by the above dyeing method.

The Present Disclosure has the Beneficial Effects that:

(1) The present disclosure uses a hydrophobic deep eutectic solvent as a dyeing medium for the first time. Compared with other existing non-aqueous dyeing media (such as dimethyl sulfoxide, dimethyl carbonate, and decamethyl cyclopentasiloxane), the components of the hydrophobic deep eutectic solvent are derived from the natural ingredient terpene, which is wide in sources, biodegradable, green and eco-friendly, so that the present disclosure meets the requirements of today's printing and dyeing industry for sustainable development.

(2) The dyeing system employed by the present disclosure can achieve a dyeing effect equivalent to that of the traditional water bath dyeing without adding any inorganic salt and other dyeing auxiliary, thus greatly reducing pollution caused by wastewater.

(3) The dyeing method of the present disclosure requires only a small amount of water, which saves a large amount of dyeing water and greatly reduces the discharge of dyeing wastewater compared with the traditional water bath dyeing.

(4) According to the present disclosure, the dye bath obtained after dyeing can be recycled through simple separation operation to obtain the hydrophobic deep eutectic solvent for cyclic dyeing, which greatly saves costs and is conducive to industrial promotion.

DETAILED DESCRIPTION

The exemplary examples of the present disclosure are described below. It should be understood that the examples are intended to better explain the present disclosure and are not intended to limit the present disclosure.

1. K/S value: under the conditions of light source D65 and 10-degree field of view, the dyeing depth K/S of a sample was determined.

2. Rubbing fastness: The rubbing fastness was determined according to GB/T 3920-2008.

3. Soaping fastness: The soaping fastness was determined according to GB/T 3921-2008.

Example 1

Firstly, menthol and thymol were mixed at 50° C. for 1 h by magnetic stirring according to a molar ratio of 1:1 to obtain clear and uniform thymol-menthol liquid. 2% o.w.f of reactive red 195 was dissolved in 140% o.w.f of water with a dye bath ratio of 1:20, and the formed reactive red dye aqueous solution was mixed with the thymol-menthol liquid at high speed of 12,000 rpm to prepare a dye liquor, where the mass ratio of the menthol-thymol liquid to dye is 930:1. 1 g of cotton fabric was swelled at room temperature in 40 g/L sodium carbonate solution for 1 h, and then the liquid entrainment rate of the cotton fabric was controlled to 120%; the swelled cotton fabric was put into a dye bath; after a dyeing tank was sealed, the cotton fabric was first dyed at 25° C. for 1 h in an infrared dyeing machine, then heated up to 60° C. and subjected to fixation for 50 min; and after dyeing, the fabric was taken out, washed with cold water and then subjected to soaping, washed with hot water and dried. The bath ratio was 1:30, the amount of sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed.

The cotton fabric dyed according to the method has a K/S value of 11.9 and a color difference ΔE of 0.62, and the dry rubbing fastness, wet rubbing fastness and soaping fastness of the dyed fabric are Grade 5, Grade 4-5 and Grade 5, respectively.

Example 2

Firstly, menthol and thymol were mixed at 50° C. for 1 h by magnetic stirring according to a molar ratio of 1:1 to obtain clear and uniform thymol-menthol liquid. 2% o.w.f of reactive red 195 was dissolved in 100% o.w.f of water with a dye bath ratio of 1:20, and the formed reactive red dye aqueous solution was mixed with the thymol-menthol liquid at high speed of 12,000 rpm to prepare a dye liquor, where the mass ratio of the menthol-thymol liquid to dye is 950:1. 1 g of cotton fabric was swelled at room temperature in 40 g/L sodium carbonate solution for 1 h, and then the liquid entrainment rate of the cotton fabric was controlled to 100%; the swelled cotton fabric was put into a dye bath; after a dyeing tank was sealed, the cotton fabric was first dyed at 25° C. for 1 h in an infrared dyeing machine, then heated up to 60° C. and subjected to fixation for 50 min; and after dyeing, the fabric was taken out, washed with cold water and then subjected to soaping, washed with hot water and dried. The bath ratio was 1:30, the amount of sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed.

The cotton fabric dyed according to the method has a K/S value of 13.9 and a color difference ΔE of 0.5, and the dry rubbing fastness, wet rubbing fastness and soaping fastness of the dyed fabric are Grade 5, Grade 4-5 and Grade 5, respectively.

Example 3

Firstly, menthol and thymol were mixed at 50° C. for 1 h by magnetic stirring according to a molar ratio of 1:1 to obtain clear and uniform thymol-menthol liquid. 2% o.w.f of reactive red 195 was dissolved in 100% o.w.f of water with a dye bath ratio of 1:20, and the formed reactive red dye aqueous solution was mixed with the thymol-menthol liquid at high speed of 12,000 rpm to prepare a dye liquor, where the mass ratio of the menthol-thymol liquid to dye is 950:1. 1 g of cotton fabric was swelled at room temperature in 60 g/L sodium carbonate solution for 1 h, and then the liquid entrainment rate of the cotton fabric was controlled to 100%; the swelled cotton fabric was put into a dye bath; after a dyeing tank was sealed, the cotton fabric was first dyed at 30° C. for 40 min in an infrared dyeing machine, then heated up to 60° C. and subjected to fixation for 30 min; and after dyeing, the fabric was taken out, washed with cold water and then subjected to soaping, washed with hot water and dried. The bath ratio was 1:30, the amount of sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed.

The cotton fabric dyed according to the method has a K/S value of 12.5 and a color difference ΔE of 0.4, and the dry rubbing fastness, wet rubbing fastness and soaping fastness of the dyed fabric are Grade 5, Grade 4-5 and Grade 5, respectively.

Example 4

Firstly, menthol and thymol were mixed at 50° C. for 1 h by magnetic stirring according to a molar ratio of 1:1 to obtain clear and uniform thymol-menthol liquid. 2% o.w.f of reactive red 195 was dissolved in 100% o.w.f of water with a dye bath ratio of 1:20, and the formed dye aqueous solution was mixed with the thymol-menthol liquid at high speed of 12,000 rpm to prepare dye liquor, where the mass ratio of the menthol-thymol to dye is 950:1. 3 g of cotton fabric was swelled at room temperature in 60 g/L sodium carbonate solution for 1 h, and then the liquid entrainment rate of the cotton fabric was controlled to 100%; the swelled cotton fabric was put into a dye bath; after a dyeing tank was sealed, the cotton fabric was first dyed at 30° C. for 40 min in an infrared dyeing machine, then heated up to 60° C. and subjected to fixation for 30 min; and after dyeing, the fabric was taken out, washed with cold water and then subjected to soaping, washed with hot water and dried. The bath ratio was 1:30, the amount of sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed.

The cotton fabric dyed according to the method has a K/S value of 12.7 and a color difference ΔE of 0.3, and the dry rubbing fastness, wet rubbing fastness and soaping fastness of the dyed fabric are Grade 5, Grade 4-5 and Grade 5, respectively.

Example 5

Firstly, menthol and thymol were mixed at 50° C. for 1 h by magnetic stirring according to a molar ratio of 1:1 to obtain clear and uniform thymol-menthol liquid. 2% o.w.f of reactive blue 19 was dissolved in 100% o.w.f of water with a dye bath ratio of 1:20, and the formed reactive blue dye aqueous solution was mixed with the thymol-menthol liquid at high speed of 12,000 rpm to prepare a dye liquor, where the mass ratio of the menthol-thymol liquid to dye is 950:1. 1 g of cotton fabric was swelled at room temperature in 60 g/L sodium carbonate solution for 1 h, and then the liquid entrainment rate of the cotton fabric was controlled to 100%; the swelled cotton fabric was put into a dye bath; after a dyeing tank was sealed, the cotton fabric was first dyed at 30° C. for 40 min in an infrared dyeing machine, then heated up to 60° C. and subjected to fixation for 30 min; and after dyeing, the fabric was taken out, washed with cold water and then subjected to soaping, washed with hot water and dried. The bath ratio was 1:30, the amount of sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed.

The cotton fabric dyed according to the method has a K/S value of 12.9 and a color difference ΔE of 0.58, and the dry rubbing fastness, wet rubbing fastness and soaping fastness of the dyed fabric are Grade 5, Grade 4-5 and Grade 5, respectively.

Example 6

Firstly, menthol and thymol were mixed at 50° C. for 1 h by magnetic stirring according to a molar ratio of 1:1 to obtain clear and uniform thymol-menthol liquid. 2% o.w.f of reactive yellow 3 was dissolved in 100% o.w.f of water with a dye bath ratio of 1:20, and the formed reactive yellow dye aqueous solution was mixed with the thymol-menthol liquid at high speed of 12,000 rpm to prepare a dye liquor, where the mass ratio of the menthol-thymol liquid to dye is 950:1. 1 g of cotton fabric was swelled at room temperature in 60 g/L sodium carbonate solution for 1 h, and then the liquid entrainment rate of the cotton fabric was controlled to 100%; the swelled cotton fabric was put into a dye bath; after a dyeing tank was sealed, the cotton fabric was first dyed at 30° C. for 40 min in an infrared dyeing machine, then heated up to 60° C. and subjected to fixation for 30 min; and after dyeing, the fabric was taken out, washed with cold water and then subjected to soaping, washed with hot water and dried. The bath ratio was 1:30, the amount of sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed.

The cotton fabric dyed according to the method has a K/S value of 7.5 and a color difference ΔE of 0.34, and the dry rubbing fastness, wet rubbing fastness and soaping fastness of the dyed fabric are Grade 5, Grade 4-5 and Grade 5, respectively.

Example 7

Firstly, menthol and thymol were mixed at 50° C. for 1 h by magnetic stirring according to a molar ratio of 1:1 to obtain clear and uniform thymol-menthol liquid. 2% o.w.f of reactive red 195, 2% o.w.f of reactive blue 19 and 2% o.w.f of reactive yellow 3 were separately dissolved in 100% o.w.f of water with a dye bath ratio of 1:20, and the formed reactive red dye aqueous solution was mixed with the thymol-menthol liquid at high speed of 12,000 rpm to prepare dye liquor, where the mass ratio of the menthol-thymol liquid to dye is 950:1. 3 pieces of 1 g of cotton fabric were swelled at room temperature in 60 g/L sodium carbonate solution for 1 h, and then the liquid entrainment rate of the cotton fabric was controlled to 100%; the 3 pieces of swelled cotton fabric were respectively put into 3 dye baths; after a dyeing tank was sealed, the cotton fabric was first dyed at 30° C. for 40 min in an infrared dyeing machine, then heated up to 60° C. and subjected to fixation for 30 min; and after dyeing, the fabric was taken out, washed with cold water and then subjected to soaping, washed with hot water and dried. The bath ratio was 1:30, the amount of sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed. The dye baths obtained after dyeing were simply separated to obtain the menthol-thymol liquid, and then the same amount of dye and water as well as a small amount of lost menthol-thymol liquid were added into the solvent, and the above dyeing steps were repeated for 5 times.

The K/S values and color differences of cloth samples dyed with the 3 dyes for a plurality of times according to the method are similar to those of the cloth samples subjected to the first dyeing, and the rubbing fastness and washing fastness of the cloth samples are the same as those of the cloth samples subjected to the first dyeing.

Example 8

The cotton fabric was dyed with reference to the method of Example 1. The difference was only that the water content in the dye liquor was adjusted to 60% o.w.f, 80% o.w.f, 100 o.w.f, 120 o.w.f, and 140 o.w.f, but the other conditions were the same as those in Example 1. See Table 1 for the results.

TABLE 1

| Water content (o.w.f) | Apparent color depth of fabric (K/S) | levelling property (ΔE) |
|---|---|---|
| 60% | 11.22 | 10.44 |
| 80% | 9.74 | 6.19 |
| 100% | 12.77 | 0.62 |
| 120% | 12.57 | 0.23 |
| 140% | 11.88 | 0.20 |

It can be seen from Table 1 that the water content is preferably 100%-120% o.w.f.

Example 9

The cotton fabric was dyed with reference to the method of Example 1. The difference was only that thymol was replaced with tetradecyl alcohol, but other conditions were the same as those in Example 1. The K/S value of the prepared cotton fabric is 14.70, and the color difference ΔE thereof is 0.94.

Example 10

The cotton fabric was dyed with reference to the method of Example 1. The difference was only that menthol is replaced with coumarin, but other conditions were the same as those in Example 1. The K/S value of the prepared cotton fabric is 13.58, and the color difference ΔE thereof is 0.64.

Example 11: A Dye Liquor

Provided is a dye liquor, and the dye liquor includes a hydrophobic deep eutectic solvent and reactive dyes, where the mass ratio of the hydrophobic deep eutectic solvent to the reactive dyes is 950:1; the hydrophobic deep eutectic solvent is composed of menthol and thymol; and the molar ratio of the menthol to the thymol is 1:1. A preparation method of the dye liquor includes the following steps:

Firstly, the menthol and the thymol were mixed at 50° C. for 1 h by magnetic stirring according to a molar ratio of 1:1 to obtain clear and uniform thymol-menthol liquid. 2% o.w.f of reactive blue 19 was dissolved in 100% o.w.f of water with a dye bath ratio of 1:20, and the formed dye aqueous solution was mixed with the thymol-menthol liquid at high speed of 12,000 rpm to prepare a dye liquor, where the mass ratio of the menthol-thymol liquid to dye is 950:1.

Comparative Example 1

0.02 g of reactive red 195 was dissolved in 20 ml of water to obtain a dye bath, 1 g of cotton fabric was put into the dye bath, dyed at room temperature, and then heated up to 60° C. at the speed of 2° C./min; after dyeing was performed for 10 min, 0.8 g of sodium sulfate was added; and then 0.4 g of sodium carbonate was added after dyeing was continuously performed for 30 min, and the fabric was subjected to fixation for one hour. After dyeing, the fabric was taken out, washed with cold water and then subjected to soaping, washed with hot water and dried. The bath ratio was 1:30, the amount of the sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed.

The cotton fabric dyed according to the method has a K/S value of 12.6 and a color difference ΔE of 0.27, and the dry rubbing fastness, wet rubbing fastness and soaping fastness of the dyed fabric are Grade 5, Grade 4-5 and Grade 5, respectively.

Comparative Example 2

0.02 g of reactive blue 19 was dissolved in 20 ml of water to obtain a dye bath, 1 g of cotton fabric was put into the dye bath, dyed at room temperature, and then heated up to 60° C. at the speed of 2° C./min; after dyeing was performed for 10 min, 0.8 g of sodium sulfate was added; and then 0.4 g of sodium carbonate was added after dyeing was continuously performed for 30 min, and the fabric was subjected to fixation for one hour. After dyeing, the fabric was taken out, washed with cold water and then subjected to soaping, washed with hot water and dried. The bath ratio was 1:30, the amount of the sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed.

The cotton fabric dyed according to the method has a K/S value of 13.1 and a color difference ΔE of 0.34, and the dry rubbing fastness, wet rubbing fastness and soaping fastness of the dyed fabric are Grade 5, Grade 4 and Grade 5, respectively.

Comparative Example 3

0.02 g of reactive yellow 3 was dissolved in 20 ml of water to obtain a dye bath, 1 g of cotton fabric was put into the dye bath, dyed at room temperature, and then heated up to 60° C. at the speed of 2° C./min; after dyeing was performed for 10 min, 0.8 g of sodium sulfate was added; and then 0.4 g of sodium carbonate was added after dyeing was continuously performed for 30 min, and the fabric was subjected to fixation for one hour. After dyeing, the fabric was taken out, washed with cold water and then subjected to soaping, washed with hot water and dried. The bath ratio was 1:30, the amount of the sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed.

The cotton fabric dyed according to the method has a K/S value of 7.3 and a color difference ΔE of 0.46, and the dry rubbing fastness, wet rubbing fastness and soaping fastness of the dyed fabric are Grade 5, Grade 4-5 and Grade 4-5, respectively.

By adopting the present disclosure, the cotton fabric dyed once and the cotton fabric dyed repeatedly in a circulating manner can both reach the color depth and color fastness of conventional water bath dyeing under the same concentration, so that the salt-free and water-reduced dyeing and cyclic dyeing of the reactive dyes can be achieved.

Comparative Example 4

The cotton fabric was dyed with reference to the method of Example 1. The difference was only that the hydrophobic deep eutectic solvent is replaced with a hydrophilic deep eutectic solvent, but other parameters were the same as those in Example 1. The method specifically includes the following steps:

Firstly, choline chloride and urea were mixed at 50° C. for 1 h by magnetic stirring according to a molar ratio of 1:2 to obtain clear and uniform thymol-menthol liquid. 2% o.w.f of reactive red 195 was dissolved in 20 ml of the choline chloride-urea liquid with a dye bath ratio of 1:20 to prepare a dye liquor. 1 g of cotton fabric was swelled at room temperature in 40 g/L sodium carbonate solution for 1 h, and then the liquid entrainment rate of the cotton fabric was controlled to 120%; the swelled cotton fabric was put into a dye bath; after a dyeing tank was sealed, the cotton fabric was first dyed at 25° C. for 1 h in an infrared dyeing machine, then heated up to 60° C. and subjected to fixation for 50 min; and after dyeing, the fabric was taken out, washed with cold water and then subjected to soaping, washed with hot water and dried. The bath ratio was 1:30, the amount of sodium carbonate used during soaping was 2 g/L, the amount of soap flakes used during soaping was 2 g/L, the soaping temperature was 95° C., the soaping time was 10 min, and the dye adsorbed on the cotton fabric but not fixed was removed. The obtained cotton fabric had no color on its surface, which indicated that it was not feasible to dye the cotton fabric with reactive dyes in a choline chlorine-urea system.

The comparison results of Examples 1, 5 and 6 show that for different kinds of reactive dyes, better dyeing effects can be achieved in a menthol-thymol system. The comparison results of Example 1 and Comparative Example 1 show that the same effect as conventional dyeing can be achieved in the menthol-thymol system without adding inorganic salts. Comparative Example 4 shows that the reactive dyes cannot work in dyeing in a hydrophilic deep eutectic solvent system.

Example 12: A Dye Liquor 130 g of choline and 90 g of oxalic acid were mixed together, and heated at 80° C. to form a solution so as to obtain a choline-oxalic acid deep eutectic solvent; and 40 mg of acidic Pula brilliant B was added into 50 g of the obtained choline-oxalic acid deep eutectic solvent, and a dye liquor was obtained by stirring evenly.

Example 13: A Dye Liquor 118 g of betaine and 192 g of citric acid were mixed together, and heated at 100° C. to form a solution so as to obtain a betaine-citric acid deep eutectic solvent; and 20 mg of acidic indigo dye was added into 100 g of the obtained betaine-citric acid deep eutectic solvent, and a dye liquor was obtained by stirring evenly.

Example 14: A Dye Liquor 117 g of choline chloride and 192 g of citric acid were mixed together, and heated at 90° C. to form a solution so as to obtain a choline-citric acid deep eutectic solvent; and 10 mg of neutral red dye was added into 100 g of the obtained choline chloride-citric acid deep eutectic solvent, and a dye liquor was obtained by stirring evenly.

Example 15: A Dyeing Method

Based on Example 12, the specific operation steps of the preparation of the anhydrous acid dye liquor with the quaternary ammonium-carboxylic acid acidic deep eutectic solvent and its use for anhydrous dyeing are as follows:

1. 130 g of choline and 90 g of oxalic acid were mixed together, and heated at 80° C. to form a solution so as to obtain a choline-oxalic acid deep eutectic solvent used as an anhydrous dyeing medium.

2. 40 mg of acidic Pula brilliant B was added into 50 g of the obtained anhydrous dyeing medium, and stirred evenly.

3. 1 g of wool fabric was put into the dye liquor, dyed at 80° C. for 15 min, and then washed with water and dried.

4. The dyeing depth K/S value (measured under the condition of a light source D65 and 10-degree field of view, the same below) of the dyed fabric obtained in step 3 was tested by using a Datacolor 850. The measured K/S value was 6.52, indicating that the anhydrous dyeing method can achieve a better dyeing effect.

Example 16: A Dyeing Method

Based on Example 13, the specific operation steps of the preparation of the anhydrous acid dye liquor with the quaternary ammonium-carboxylic acid acidic deep eutectic solvent and its use for anhydrous dyeing are as follows:

1. 118 g of betaine and 192 g of citric acid were mixed together, and heated at 100° C. to form a solution so as to obtain a betaine-citric acid deep eutectic solvent used as an anhydrous dyeing medium.

2. 20 mg of acidic indigo dye was added into 100 g of the obtained anhydrous dyeing medium, and stirred evenly.

3. 1 g of wool fabric was put into the dye liquor, dyed at 70° C. for 20 min, and then washed with water and dried.

4. The dyeing depth K/S value of the dyed fabric obtained in step 3 was tested by using a Datacolor 850. The measured K/S value was 3.32, indicating that the anhydrous dyeing method can achieve a better dyeing effect.

Example 17: A Dyeing Method

Based on Example 14, the specific operation steps of the preparation of the anhydrous acid dye liquor with the quaternary ammonium-carboxylic acid acidic deep eutectic solvent and its use for anhydrous dyeing are as follows:

1. 117 g of choline chloride and 192 g of citric acid were mixed together, and heated at 90° C. to form a solution so as to obtain a choline-citric acid deep eutectic solvent used as an anhydrous dyeing medium.

2. 10 mg of neutral red dye was added into 100 g of the obtained anhydrous dyeing medium, and stirred evenly.

3. 1 g of wool fabric was put into the dye liquor, dyed at 90° C. for 30 min, and then washed with water and dried.

4. The dyeing depth K/S value of the dyed fabric obtained in step 3 was tested by using a Datacolor 850. The measured K/S value was 3.45, indicating that the anhydrous dyeing method can achieve a better dyeing effect.

Comparative Example 5

The wool fabric was dyed with reference to the method of Example 15. The difference was that the choline-oxalic acid acidic deep eutectic solvent was replaced with the choline-urea alkaline deep eutectic solvent in an amount of equal mass for dyeing the wool fabric, but other conditions were the same as those in Example 15. The K/S value of the dyed wool fabric is 0.35.

Comparative Example 6

The wool fabric was dyed with reference to the method of Example 15. The difference was that the deep eutectic solvent was replaced with the water in an amount of equal mass and the pH value was adjusted to 4.5 by using acetic acid for dyeing the wool fabric, but other conditions were the same as those in Example 15. The K/S value of the dyed wool fabric is 1.25.

Comparative Example 7: Conventional Acid Dye Dyeing Method

The wool fabric was dyed with reference to the method of Example 15. The difference was that the deep eutectic solvent is replaced with the water in an amount of equal mass, the dyeing temperature was adjusted to 95° C. and the pH value was adjusted to 4.5 by using acetic acid for dyeing the wool fabric, but other conditions were the same as those in Example 15. The K/S value of the dyed wool fabric is 3.45.

Comparative Example 8

Referring to Example 12, the difference was that the dye liquor contained 5%, 10% and 15% of water (a mass ratio to a deep eutectic solvent), respectively. Then, the wool fabric was dyed with reference to the method of Example 15, and other conditions were the same as those in Example 15. The results show that the K/S values of the fabric are 5.42, 5.13 and 4.85 when the dye liquor contains 5%, 10% and 15% of water, respectively. If the system contains water or a small amount of water, it will bring bad effects. Preferably, the water content in the dye liquor system is 0%.

TABLE 2

| Sample | K/S value |
| --- | --- |
| Example 15 | 6.52 |
| Example 16 | 3.32 |
| Example 17 | 3.75 |
| Comparative Example 5 | 0.35 |
| Comparative Example 6 | 1.25 |
| Comparative Example 7 | 3.45 |

Although the present disclosure has been disclosed as above in exemplary examples, it is not intended to limit the present disclosure. Any person familiar with the art can make various changes and modifications without departing from the spirit and scope of the present disclosure. Therefore, the scope of protection of the present disclosure should be subject to the definition in the Claims.

What is claimed is:

1. A dye liquor, wherein the dye liquor comprises a hydrophobic deep eutectic solvent and reactive dyes; and the hydrophobic deep eutectic solvent comprises a hydrogen bond donor and a hydrogen bond acceptor.

2. The dye liquor according to claim 1, wherein the hydrogen bond donor comprises thymol or tetradecyl alcohol; and the hydrogen bond acceptor comprises menthol or coumarin.

3. The dye liquor according to claim 1, wherein a molar ratio of the hydrogen bond donor to the hydrogen bond acceptor is (0.5-2):1.

4. The dye liquor according to claim 1, wherein a mass ratio of the hydrophobic deep eutectic solvent to the reactive dyes in the dye liquor is (900-990):1.

5. A dye liquor, wherein the dye liquor comprises a hydrophilic acidic deep eutectic solvent and an acid dye.

6. The dye liquor according to claim 5, wherein a mass ratio of the hydrophilic acidic deep eutectic solvent to the acid dye is 500:1 to 20,000:1.

7. The dye liquor according to claim 5, wherein the deep eutectic solvent comprises a hydrogen bond donor and a hydrogen bond acceptor; the hydrogen bond donor in the hydrophilic acidic deep eutectic solvent is a quaternary ammonium salt, comprising choline or betaine; and the hydrogen bond acceptor is a carboxylic acid, comprising formic acid, acetic acid, oxalic acid, citric acid or malic acid.

8. The dye liquor according to claim 5, wherein a molar ratio of a quaternary ammonium salt to the carboxylic acid is 1:(0.5-2).

9. A dyeing method of cellulose textiles with reactive dyes, wherein the dyeing method comprises the steps of mixing a hydrophobic deep eutectic solvent with reactive dyes to obtain a dye liquor, and then dyeing the cellulose textiles with the dye liquor; the hydrophobic deep eutectic solvent comprises a hydrogen bond donor and a hydrogen bond acceptor; and the water content in the dye liquor is 60%-150% o.w.f.

10. The dyeing method according to claim 9, wherein the hydrogen bond donor comprises thymol or tetradecyl alcohol; and the hydrogen bond acceptor comprises menthol or coumarin.

11. The dyeing method according to claim 10, wherein a molar ratio of the hydrogen bond donor to the hydrogen bond acceptor is (0.5-2):1.

12. The dyeing method according to claim 9, wherein a mass ratio of hydrophobic deep eutectic solvent to the reactive dyes in the dye liquor is (900-990):1.

13. The dyeing method according to claim 9, wherein the method comprises the specific steps of:
    (1) firstly, evenly mixing the hydrogen bond donor and the hydrogen bond acceptor to obtain the hydrophobic deep eutectic solvent;
    (2) dissolving the reactive dyes in water, and then mixing with the hydrophobic deep eutectic solvent prepared in step (1) to obtain the dye liquor; and
    (3) swelling cotton fabric in a sodium carbonate aqueous solution, and then putting same into the dye liquor for dyeing.

14. The dyeing method according to claim 9, wherein the cellulose textiles comprise any one of cellulose fibers or composite fibers containing the cellulose fibers, yarns, blanket fabrics, woven fabrics, knitted fabrics, warm keeping wadding, fillers, non-woven fabrics, clothing, clothing accessories, home textiles, decorations, medical and health supplies or work clothes.

15. The cellulose textiles dyed by using the method according to claim 9.

16. A dyeing method of protein textiles with an acid dye, comprising adding a predetermined amount of the dye liquor according to claim 5 to a bath containing protein textiles and dyeing the protein textiles.

17. The dyeing method according to claim 16, wherein the weight of the dye liquor to the fabric is 0.5%-4%, and a dyeing temperature is 70-100° C.

18. The protein textiles obtained by the dyeing method according to claim 16.

* * * * *